Figure 1:
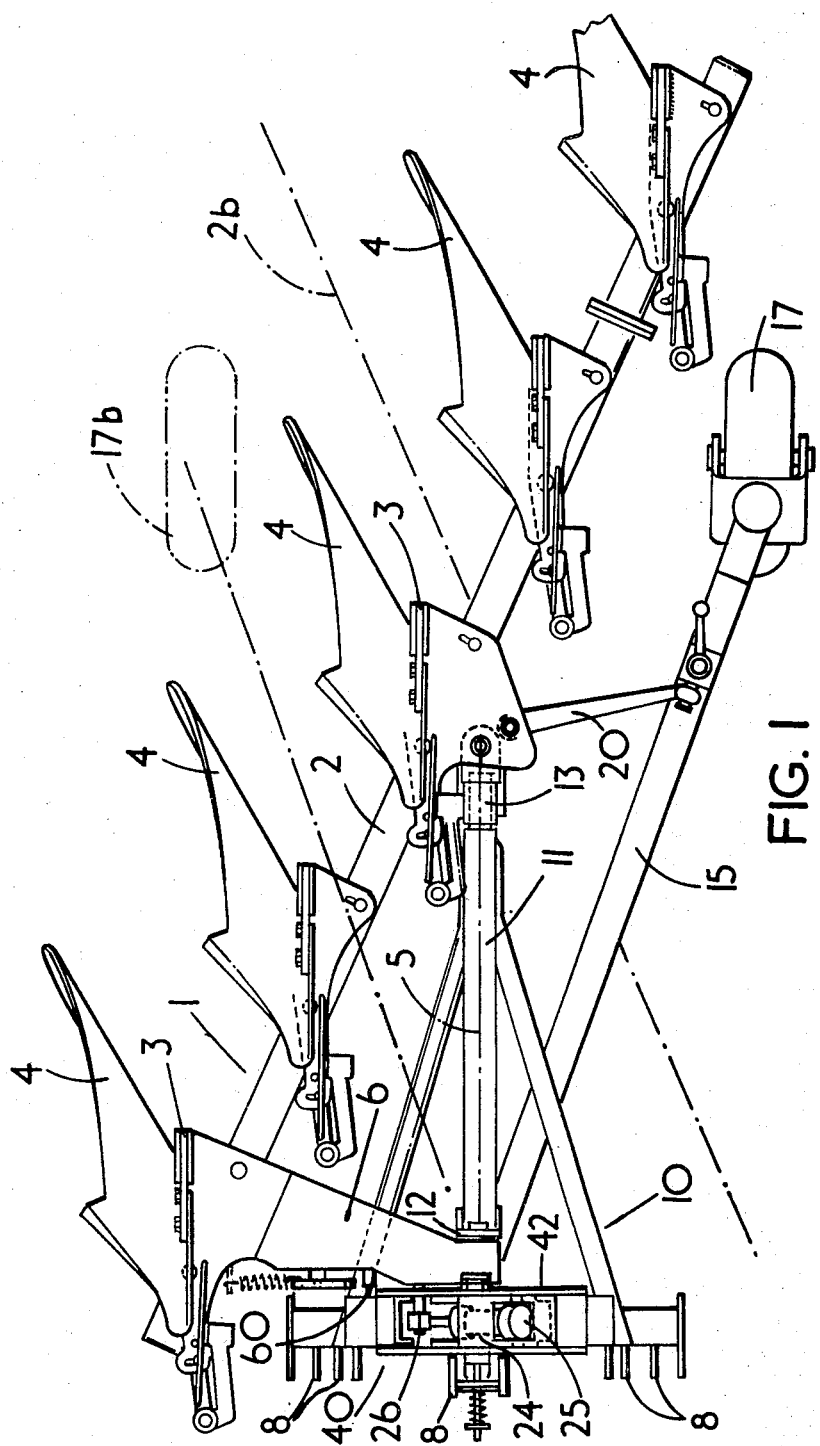

United States Patent [19]
Dowdeswell

[11] 3,848,678
[45] Nov. 19, 1974

[54] REVERSIBLE PLOUGH OPERATING MEANS

[76] Inventor: Charles Vernon Roger Dowdeswell, Lower Radbourne Farm, Southam, Leamington Spa, Warwickshire, England

[22] Filed: Dec. 22, 1972

[21] Appl. No.: 317,820

[52] U.S. Cl.............................. 172/225, 172/212
[51] Int. Cl........................... A01b 3/44, A01b 3/46
[58] Field of Search............ 172/212, 224, 225, 204

[56] References Cited
UNITED STATES PATENTS

| | | | |
|---|---|---|---|
| 2,868,307 | 1/1959 | Schwegler............................ | 172/225 |
| 3,305,027 | 2/1967 | Walberg............................... | 172/225 |
| 3,386,518 | 6/1968 | Mellen................................. | 172/225 |

FOREIGN PATENTS OR APPLICATIONS

| | | | |
|---|---|---|---|
| 998,843 | 7/1965 | Great Britain....................... | 172/225 |
| 1,949,223 | 4/1971 | Germany............................. | 172/225 |

Primary Examiner—Robert E. Pulfrey
Assistant Examiner—Paul T. Sewell
Attorney, Agent, or Firm—Watson, Cole, Grindle & Watson

[57] ABSTRACT

Operating mechanism is disclosed for a reversible plough in which the ploughshare carrying frame is operated for plough reversal turnover movement about a longitudinal pivotal axis on support structure by a fluid pressure operated ram which is pivotally connected between the plough frame and a crank member pivotally carried from upstanding support of the support structure for over centre action of the ram, the crank member having bearing surface formation which is engaged by a projection on the plough frame during the substantially midway raised position of plough frame turnover movement in order to support the plough frame at said position during over centre reversal of the ram and crank member.

3 Claims, 4 Drawing Figures

REVERSIBLE PLOUGH OPERATING MEANS

This invention has reference to agricultural ploughs of the kind known as reversible ploughs in which two series of ploughshares are carried by a plough frame which is arranged to be turned over to present one or the other series of ploughs to the ground as the plough frame is drawn by a tractor.

The invention is concerned with operating mechanism for effecting such reversal of the plough frame and wherein the mechanism is of the kind consisting of a fluid pressure operated or hydraulic ram pivotally connected to the plough frame and pivotally carried from support structure by a crank member so as to have an over centre action in carrying out reversal movement of the plough frame.

The object of the invention is to provide improved operating mechanism of the above mentioned kind in which the plough frame is more positively supported or located at the substantially midway or raised position during its turnover movement so as to largely relieve the ram against undesired stresses. Practical advantages of the invention in this respect will be apparent from the following disclosure.

Figure 2:
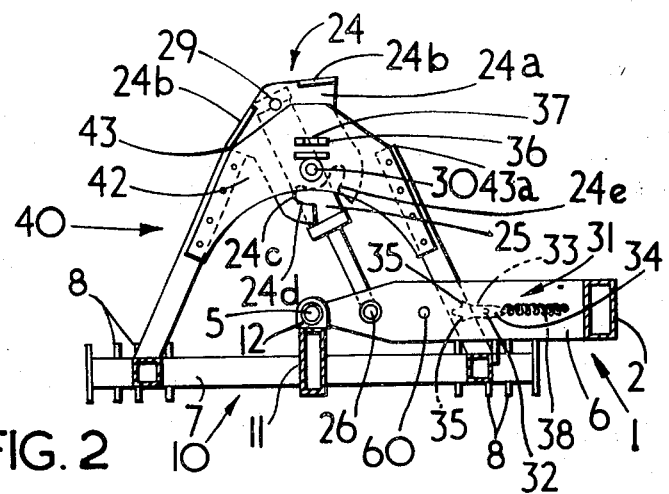
Figure 3:
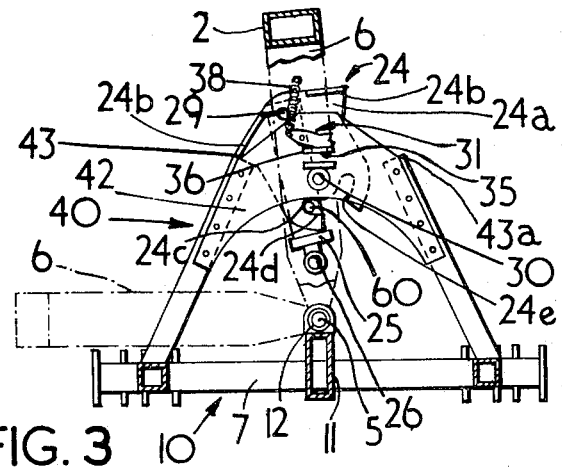
Figure 4:
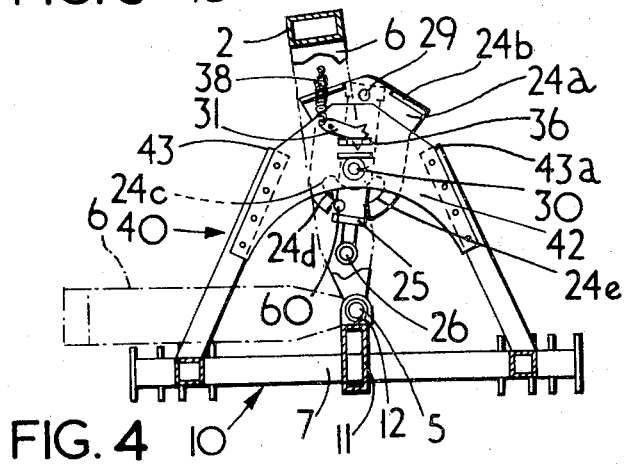

In a practical embodiment of the invention the construction and arrangement is as follows reference being had to the accompanying drawings in which:

FIG. 1 is a plan view of a reversible plough embodying operating mechanism according to this invention and FIGS. 2, 3 and 4 are rear views in the direction of the arrow II of FIG. 1 and showing the operating mechanism respectively at the commencement and midway positions of turnover movement.

The reversible plough frame 1 and supporting structure 10 for it may be of any suitable construction such as that shown in FIG. 1 which is in accordance with the specification of my prior U.S. Pat. No. 3,730,279 and corresponding reference numerals are employed.

The plough frame 1 includes a forward cross member 6 and the forward part of a rearwardly extending and inclined boom 2 carrying two series of ploughshares 4 of which the upstanding inoperative series are visible and are carried by legs from the boom the other series being oppositely mounted in the same manner and being directly underneath in engagement with the ground. On reversal of the plough frame 1 about the axis 5 the boom 2 assumes the position indicated at 2b with the visible plough shares then engaged with the ground whilst castor tail wheel support 17 carried by an arm 15 pivotally linked at 20 to the boom 2 is swung to the position indicated at 17b.

The supporting structure 10 for the plough frame 1 is shown consisting of a forward cross member 7 and a rearwardly extending beam 11 on which the plough frame is pivotally mounted at 12 and 13 about the longitudinal axis 5.

The supporting structure 10 is arranged to be mounted at 8 from the usual three point implement linkage of an agricultural tractor and includes an upstanding support 40 which pivotally carries at 30 a crank member or stirrup 24 and which in turn pivotally carries at 29 the cylinder of a double acting ram 25, the piston rod of which is pivotally connected at 26 to the plough frame cross member 6.

The crank member 24 consists of two plates, the rear of which is shown at 24a, and which are secured together such as by welded cross pieces 24b to provide a stirrup accommodating the cylinder of the ram 25, the crank stirrup 24 being pivotally mounted at 30 between front and rear plates of the support 40, the rear plate being shown at 42.

As viewed from the rear, the cross member 6 is shown in position in FIG. 2 as for a right hand operative lowered position of the plough frame with the ram 25 extended and the crank 24 in abutment with a shoulder 43 of the support 40. On contraction of the ram 25 the cross member 6 and plough frame are raised to an over-centre substantially midway position as shown in FIG. 2 about the longitudinal axis 5.

On reaching this position a projection or pin 60 on the cross member 6 enters a cutaway or open slot 24c in the crank 24 and in particular bears on a bearing or cam surface 24d such that the cross member 6 and plough frame 1 are unable to move beyond the midway position without extension of the ram 25.

Furthermore and on initial extension of the ram 25 from such contracted condition the crank 24 is pivotally moved or reversed from one over centre position to the other (FIG. 3) with corresponding pivotal movement of the ram 25 during which time the cross member 6 and plough frame are held at the over centre midway position by the engagement of the pin 60 with the bearing or cam surface 24d which has moved relative to the pin 60.

After such initial reversal movement of the crank 24 and as the pin 60 reaches the free end of the bearing or cam surface 24d its co-action therewith on further ram extension is such that it moves clear for continued turnover movement of the cross member 6 and plough frame 1 towards the left hand lowered operative position and at the same time thrusts the crank 24 about its pivotal mounting 30 into abutment with the support 40 at the shoulder 43a. The ram 25 thus assumes an appropriate over centre position for full extension with final turnover movement of the cross member 6 and plough frame 1.

For turnover movement in the opposite direction the plate 24a of the crank 24 is provided with a further oppositely arranged bearing or cam surface 24e for similar co-operation with the pin 60 so that an escapement like action is obtained. The bearing surfaces 24d, 24e are of curved formation centered about the pivot 30 having regard to the relative movement between them and the pin 60.

In a refinement the forward cross member 6 pivotally carries at its front at 32 a catch or pawl 31 which is resiliently retained in an in line position in relation to the cross member 6 by a tension spring 38 anchored between the cross member 6 and the head 34 of the catch 31. The remainder or tail 33 of the catch 31 is provided with projections 35 similar to ratchet teeth and which co-operate with an opening or slot 37 in a fixed bracket or lug 36 projecting from the rear plate 42 of the support 40. As will be seen from FIGS. 2 and 3 the trailing action of the catch 31 is such that it rides into engagement with the slot 37, on the cross member 6 reaching an over centre midway position, abutment of the appropriate projection 35 with the bracket 36 positively preventing back movement of the cross member 6 and plough frame 1 from the over centre midway position. The catch 31 has the same non-return action when the cross member 6 is turned in the opposite direction.

As will be appreciated from the foregoing the support and/or location provided by the bearing or cam surface 24d or 24e and by the catch 31 positively locates the cross member 6 and plough frame 1 in the raised over centre midway position and prevents continued or back pivotal movement of the plough frame 1 from such position, i.e., in the event of the raised plough being violently swung on being turned at a headland especially over uneven ground. Consequent stress or breakage of the ram 25 is thus virtually avoided particularly in the case of heavy plough frame assemblies.

I claim:

1. Reversible plough mechanism for a reversible plough of the character described, in which a plough share carrying frame is pivotally mounted on support structure for turnover movement about a longitudinal axis in effecting plough reversal, the operating mechanism being carried from an upstanding support mounted on the support structure and comprising: a fluid pressure operated double acting ram which is pivotally connected about respective axes, parallel with said longitudinal axis between a forward part of the ploughshare carrying frame and the upper part of a crank member which latter is pivotally carried about a further axis parallel with and between said axes by the upstanding support whereby the ram is carried by the crank member for over center movement therewith relative to said further axis on said turnover movement of the ploughshare carrying frame, said crank member having two opposed bearing surfaces of curved form about and below said further axis; and a projection which is carried by said forward part of the ploughshare carrying frame and which, dependent on the direction of turnover movement, engages a corresponding bearing surface of the crank member when the ploughshare carrying frame is in the substantially midway over center raised position of turnover movement in order to retain the ploughshare carrying frame at said position prior to release of said engagement by reverse pivotal movement of the crank member on initial extension of the ram.

2. A reversible plough operating mechanism according to claim 1, wherein a catch is pivotally carried by the ploughshare carrying frame for riding into non-return abutment with a cooperating bracket on a mid-part of said upstanding support for supporting the ploughshare carrying frame against back movement from the substantially mid-way raised over center position thereof.

3. Reversible plough operating mechanism according to claim 1 wherein the crank member is slotted to provide the bearing surfaces.

* * * * *